United States Patent [19]

Kemper

[11] 4,344,416

[45] Aug. 17, 1982

[54] SOLAR ENERGY COLLECTOR

[76] Inventor: Charles R. Kemper, 3487 Far Hills Ave., Kettering, Ohio 45429

[21] Appl. No.: 115,334

[22] Filed: Jan. 25, 1980

[51] Int. Cl.³ .............................................. F24J 3/02
[52] U.S. Cl. .................................... 126/438; 126/439
[58] Field of Search .............. 126/438, 439, 440, 451, 126/448, 450; 165/181, 182

[56] References Cited

U.S. PATENT DOCUMENTS 4,099,515  7/1978  Schertz .............................. 126/438
4,142,510  3/1979  Hare .................................. 126/438

FOREIGN PATENT DOCUMENTS 2552102  5/1976  Fed. Rep. of Germany ...... 126/439
2712310  9/1978  Fed. Rep. of Germany ...... 126/438
2420096  11/1979 Fed. Rep. of Germany ...... 126/439

*Primary Examiner*—James C. Yeung

[57] ABSTRACT

A solar energy collector comprises a housing within which are mounted a series of manifolded hollow tubes adapted to carry a circulating heat absorbing and transporting fluid medium. A reflective surface closely associated with the tubes is characterized in cross section by a repetitive sequence of compound angles defining a series of side-by-side troughs with upwardly divergent sidewalls spanned at their base by tented bottom wall segments; and the tubes are partially nested in the troughs in such a manner that some of the solar rays impinging upon the collector strike the surface of the tubes about part of their circumference and the balance of such rays are reflected or re-reflected by the angularly disposed reflector surfaces to strike the tubes about the remainder of their circumference. The outer surface of the tubes is preferably grooved to enhance the area thereof to be directly and reflectively impinged by the solar rays and reflected solar rays and chemically tarnished to increase the heat absorptive characteristics thereof.

2 Claims, 6 Drawing Figures

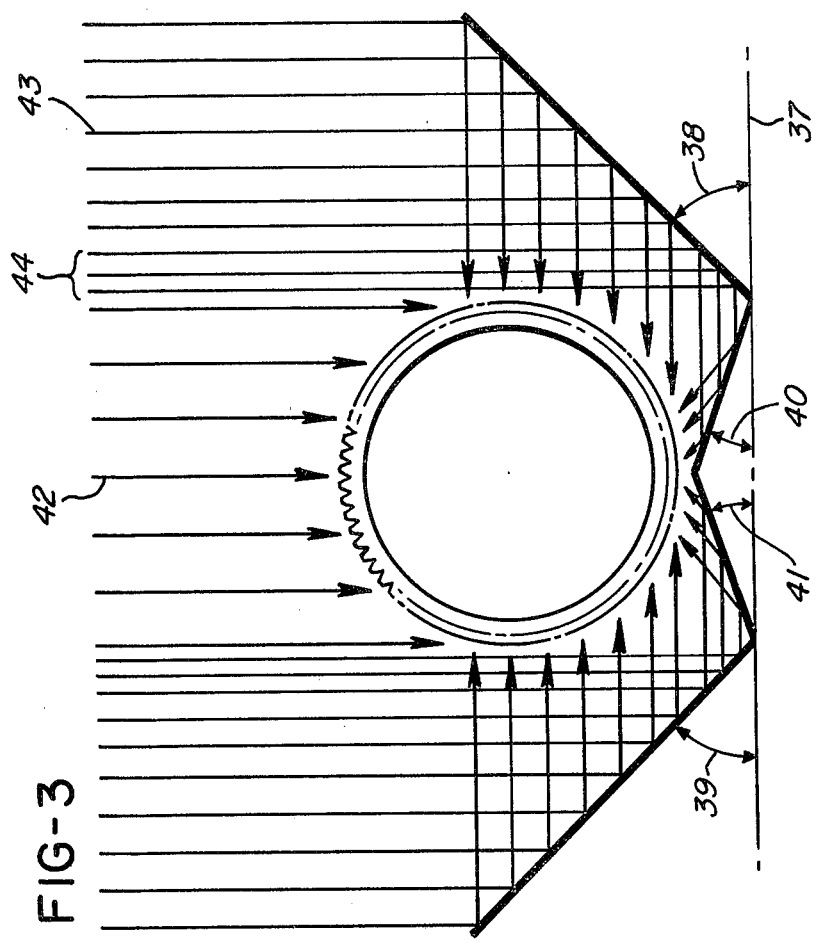
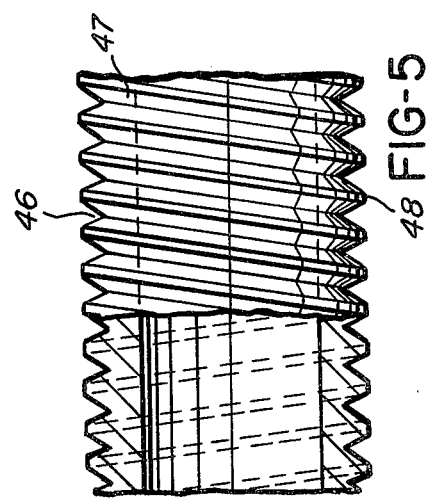

1

SOLAR ENERGY COLLECTOR

BACKGROUND OF THE INVENTION

This invention relates to solar energy collectors particularly of the type that conventionally comprise metallic tubing carrying a circulating medium such as water which absorbs heat from solar rays and transports it to a place where it is to be utilized or stored. For maximum exposure to such rays, the tubing has heretofore been arranged in a variety of patterns in close proximity to reflecting surfaces (frequently moveable to follow the path of the sun) so that the tubes will be struck and heated not only by the direct but also by some of the reflected rays. The prior art has, for example, employed semi-circular and semi-rectangular reflectors partially embracing or surrounding the tubes; but these have at best resulted in uneven distribution of the rays circumferentially of the tubes with resultant peripherally non-uniform heating which seriously limits the heat transfer efficiency of the assembly. Moreover, the prior art devices have not been capable of focusing a maximum amount of the solar rays striking the collector upon the tubes which has resulted in further inefficiency.

Because the efficiency of the energy collection, heat absorption and heat transfer of the prior art devices has been relatively low, it has been necessary to employ relatively large and cumbersome collector assemblies in relatively large numbers to provide sufficient energy to heat a house or building for example or even to heat water to be consumed by the inhabitants of a particular building. In many cases, practical limitations of space available to accommodate such large structures and/or large numbers of collectors have simply made it impossible to provide sufficient collector capacity to make the use of such devices a viable alternative to other heating methods and systems. In almost all other cases, the cost of the collectors and the required auxilliary structures to mount them has been such as to render solar heating economically unfeasible. Additionally, the adaptation of heavy supporting structures with devices capable of moving the reflectors to track facing the sun during the course of its relative travel across the sky has been exceedingly and prohibitively expensive to the extent that the otherwise desirable tracking feature has not been available for most actual commercial or residential applications of solar heating. The improved efficiencies of the system according to the within invention substantially reduce this problem and render the use of tracking mechanisms much less complicated and expensive.

It is accordingly a general object of this invention to provide a more efficient solar energy collector capable of absorbing and utilizing a greater amount of energy embodied in the impinging rays of the sun than has heretofore been achieved with prior art devices of the same or comparable sizes and weights.

SUMMARY OF THE INVENTION

The invention comprises an interconnected arrangement of hollow tubular members, suitably valved and fitted to afford and accommodate a circulating fluid medium within the tubular walls. Closely spaced from and coextensive with such arrangement is a reflector characterized by a repetitive sequence of surface segments disposed in a repetitive sequence of compound or differing angles providing alternating high and low peaks separated by intermediate valleys. The interrelationship between the array of tubular members and the reflector is such that the tubes are positioned over the low peaks of the reflector surface in or partially within the troughs between its high peaks. Such troughs are defined in part by spaced, upwardly divergent sidewalls, the upper edges of which are also the lines of intersection between or contact of the sidewalls of adjoining troughs and represent the high peaks as aforesaid. These upper edges are at or above the plane which bisects the tubes as they are so positioned within the troughs; and this, coupled with the angle of the upward divergence of the sidewalls, causes those solar rays coming into the trough and not striking the tubular members directly to be reflected on to areas of the tubes which are not so striken. The troughs are further defined by tented bottom wall segments spanning the lower edges of the sidewalls; and such segments are inclined toward and, by their intersection, form the lower peaks underlying that portion of the tubes positioned therein which is opposite the areas thereof directly aimed at and exposed to the sun. The angle of that inclination is then such that solar rays passing near the tubes and striking the sidewalls near their intersection with the bottom wall segments so as not to be reflected on to the tubes are instead reflected on to the tented bottom wall segments and then, by them, re-reflected on to the bottom of the tubes.

As a result of this reflector configuration and its positioning relative to the tubes, substantially all of the solar rays coming into the reflector are utilized to heat the tubes about their entire circumference; and the fluid within the tubes is heated with greatly improved efficiency. To maximize the uniformity of the heating about the entire tubular surfaces, the opening of the reflector troughs defined by the successive lines of intersection of the sidewalls of adjoining troughs is of a width at least twice the outside diameter of the tubes; and, to compensate for the relatively lower heating intensity of the reflected rays, as opposed to that of the rays directly striking the tubes, the trough opening is preferably of a width equal to from two and one-half to three times the outside tube diameter.

To improve further the efficiency of solar energy absorption and transfer for a given size of tubular member (and a given relative size of the structural assembly necessary to support and house the tubes and reflector), the tubes are grooved or scored in a convenient pattern about their outer surfaces; and all of the exposed surfaces of the tubes, including those defining the grooves thereon, may be dulled or discolored, not with a distinct, applied film or coating as has been practiced in the art, but rather by a chemical tarnishing process which eliminates the heat transfer barrier caused by the interface of two dissimilar materials.

BRIEF DESCRIPTION OF THE DRAWINGS

FIG. 3 is a schematic illustration of a tube and a portion of a reflector according to the invention showing the distribution of solar rays striking the collector.

FIG. 5 is a fragmentary view, partially broken away and in partial section, of another modification of a tube to be embodied in the invention.

DESCRIPTION OF THE PREFERRED EMBODIMENTS

Figure 1:
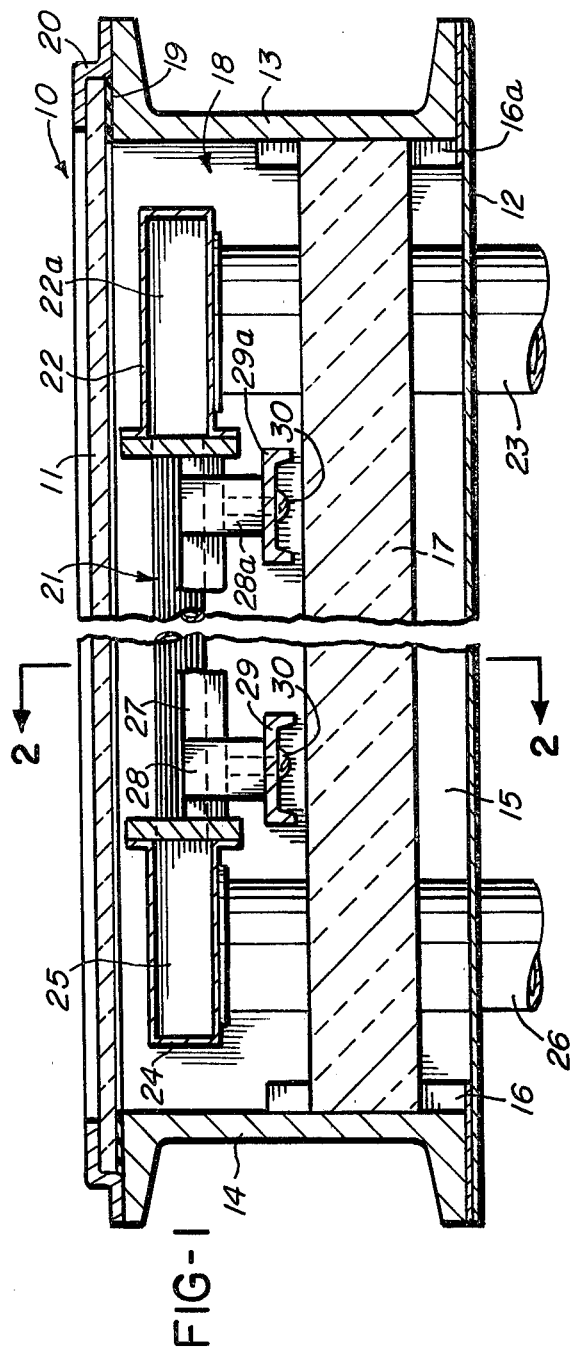
FIG. 1 is a broken view, in partial section, of the assembly of a solar energy collector embodying the features of the invention.
Figure 2:
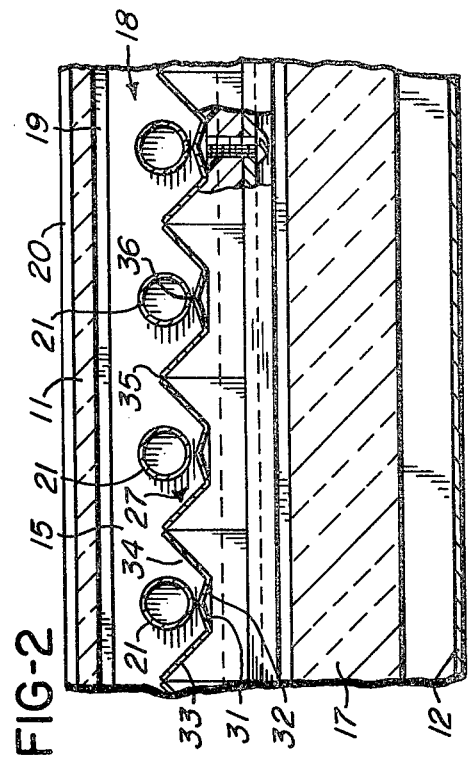
FIG. 2 is a cross sectional view on the line 2—2 of FIG. 1.

As shown in FIGS. 1 and 2, a solar energy collector 10 according to one preferred embodiment of the invention comprises a hollow box-like enclosure or housing 10 formed by the front glass plate 11, the rear metal backing 12 and the spacing and edge closure members 13, 14 and 15 (the fourth edge member being deleted by the sectioning in FIG. 1). Held in spaced relation from the metal backing 12 by appropriate spacer blocks or bars 16 and 16a is a sheet or layer 17 of a thermally insulating material such as a bonded asbestos or cellulosic material which is coextensive with the glass plate 11 and abuts all of the edge members 13, 14 and 15 so as to form, with such edge members and glass plate, an insulated enclosure 18. To more completely isolate the enclosure 18, a rubber-like air sealing gasket 19 is positioned between the glass 11 and the edge members 13, 14 and 15; and the glass and gasket are held against the edge members by the clamping bracket 20 which is affixed to the edge members by welding or other fastening means (not shown).

Positioned within the insulated chamber 18 are a plurality of hollow tubular members 21 in parallel array. At one end of the tubes 21, they are welded or otherwise fastened to and in fluid-transmitting communication with a manifolding hollow header 22 having an interior fluid chamber 22a which is connected to the fluid outlet pipe 23. At the opposite ends of the tubes 21, they are similarly connected to an intake manifold 24, the interior hollow chamber 25 of which effects a fluid-transmitting communication between all of the tubes 21 and the intake pipe 26. The outlet and inlet pipes 23 and 26 respectively are in turn connected with suitable plumbing (not shown) to create a circulation of fluid within the tubes and the manifolds to and from a reservoir or heat exchange apparatus (not shown) where the absorbed energy is to be stored or utilized. The tubes 21 are of such length that, together with the manifolds 22 and 24, they substantially occupy the complete area of the insulated chamber 18 under the face glass 11 to afford maximum heat absorption capacity for a collector box 10 of a given size.

Underlying the tubes 21 throughout their length between the manifold headers 22 and 24 are reflector channels 27 which are held in positon by the mounting blocks 28 and 28a which are in turn fastened to stringers 29 and 29a extending the width of the box 10 and mounted upon the edge members 14 and its counterpart (not shown). As can be seen, the mounting blocks 28 and 28a are fastened to the stringers 29 and 29a by screws 30; while the reflector units 27 are held within the blocks 28 and 28a by an adhesive, welding or other fastening means such as screws (not shown).

As best shown in FIGS. 2 and 3, the reflector channels 27 are so formed that their bottom wall is made up of two tented or mutually inclined segments or halves 31 and 32 which intersect centrally of the bottom of the trough and are intersected respectively at their opposite edges by the angularly disposed sidewall elements 33 and 34, whereby it can be seen that the reflective channels 27 are characterized in cross section by a compound angular configuration corresponding to the letter "W". The assembly of a plurality of such channels in side-by-side, touching relation as shown in FIG. 2 results in a reflector surface characterized by alternating high peaks 35 (formed by the intersection of the sidewalls 33 and 34) and low peaks 36 (formed by the intersection of the bottom wall segments 31 and 32).

Relative to a reference plane 37 through the respective lines of intersection of the bottom wall segments 31 and 32 with the sidewalls 33 and 34, which is perpendicular to the direction in which the reflector channels open and in which the solar rays will enter the collector, the sidewalls 33 and 34 are disposed at the angles 38 and 39 which are preferably on the order of forty-five degrees. Relative to this same reference plane 37, the bottom wall segments 31 and 32 are tented or upwardly inclined in the direction of the tube 21 at the angles 40 and 41 respectively which, in the preferred embodiment illustrated, are on the order of twenty degrees. While these angles 38, 39, 40 and 41 are found to be optimum for the most efficient collection and distribution of solar rays striking the reflectors when such rays are considered as being normal to the front face of the collector, it is to be understood that they may be varied within tolerances of up to plus or minus five degrees as to the sidewall angles 38 and 39 or up to three degrees as to the ridge angles 40 and 41 without departing from the teachings and the substantial benefits achievable by the practice of the within invention.

While the reflector channels 27 may be composed of a variety of materials, it is required that their interior surfaces facing the tubes 21 be highly reflective; and a stainless steel strip 0.015 inch in thickness with a velvet smooth finish on the side toward the tubes is satisfactory. While the reflector channel units are shown and described as being separate as to each trough-like configuration, it is possible to form a single reflector sheet into a plurality of parallel troughs, each defined by the described arrangement of bottom and sidewall elements to achieve the same effects.

As shown in FIGS. 2 and 3, the reflective dimensions and spacings of the tubes 21 and the reflectors 27 are such that the tubes 21 are nested within and partially surrounded by the reflective troughs formed between the high peaks 35 by the channel members 27 but are not in contact with them at any point. The upper, outermost edges of the sidewalls 33 and 34 defining the opening of the reflector trough to the sun are preferably spaced from each other by a distance at least equal to twice the outside diameter of the tubes 21 and that the sidewalls 33 and 34 terminate at least half way up the tubes in their nested position. In the preferred embodiment illustrated, the tubes 21 are three-eights of an inch in diameter and have a wall thickness of 0.032 inch. The sidewalls, angled as above described, are 0.442 inch; while the tented bottom wall halves 31 and 32 are 0.197 inch wide. Consequently, the opening defined by the upper edges of the sidewalls 33 and 34 is one inch; while the width of the trough at its base; i.e., between the lower edges of the sidewalls 33 and 34 is three-eights of an inch, equal by design to the outside diameter of the tube 21 centrally positioned therein. The tubes 21 may be composed of a soft copper or other thermally conductive material.

The result of this arrangement and proportioning of parts, as shown in FIG. 3, is that solar rays striking the collector and passing through the glass face 11 toward the tubes and reflective surfaces will either strike the tubes directly, as in the case of the rays 42, will strike the sidewalls of the reflective troughs and be reflected laterally on to the sides of the tubes as in the case of the rays 43, or will narrowly pass by the tubes and be reflected from the lower portions of the sidewalls 33 and 34 to strike the angularly disposed bottom wall segments 31 and 32 and be by them re-reflected on to the underside of the tubes 21 as in the case of the rays 44. As illustrated, this construction provides for the impingement of substantially the same intensity of solar rays about the entire outer circumference of the tubes 21 as a result of which the maximum amount of the incoming solar energy can be transmitted through the conductive metal of the tube walls into the hollow chamber interiorly thereof to be there absorbed by the circulating heat absorption and transporting medium.

Figure 4:
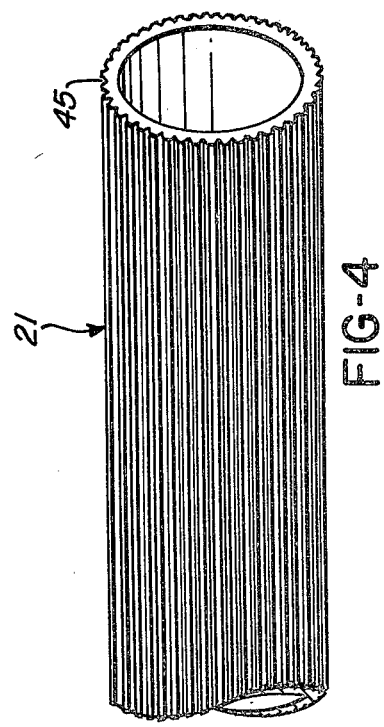
FIG. 4 is a fragmentary perspective view in partial section of a tube to be embodied in one form of the invention.

To increase the effective outer surface of the tubes 21 and afford a greater energy absorbing area for tubes of a given (and relatively small) diameter, the exterior of the tubes are preferably provided with grooves, preferably V-shaped in cross section. While the effective surface area of the tube 21 may be so maximized by the provision of the parallel longitudinal arrangement of grooves 45 as shown in FIG. 4, like efficiencies may be obtained by providing a continuous spiral groove 46 longitudinally of a similar tube 47 as shown in FIG. 5. Similarly, the V-shaped grooves may be a plurality of circumferential or annular grooves, closely spaced longitudinally of the tubes. Where, as in the case of the preferred embodiment illustrated and described above, the copper tube such as 21 or 47 is three-eights of an inch in outside diameter and has a wall thickness of 0.032 inch, the grooves may extend to a depth of 0.010 inch radially of the tubes. Where, as in the preferred embodiments, the sidewalls of the V-shaped grooves converge at a sixty-degree angle, a cross section in the form of an equilateral triangle results wherein the width of each groove sidewall is equal to the width of the chord of the groove opening upon the tubular surface. Thus, if such grooves were juxtaposed with no spacing between their openings, the total exposed area would be twice the outer surface area of the tube without grooves. Where manufacturing, stability or other considerations dictate some spacing between the groove openings as in the case of the space 48 between the consecutive convolutions of the spiral groove 46 in FIG. 5, it can be seen that, even so, the outer surface area is substantially increased by the utilization of grooves the consecutive openings of which are spaced by as much as the width of the openings themselves.

Figure 6:
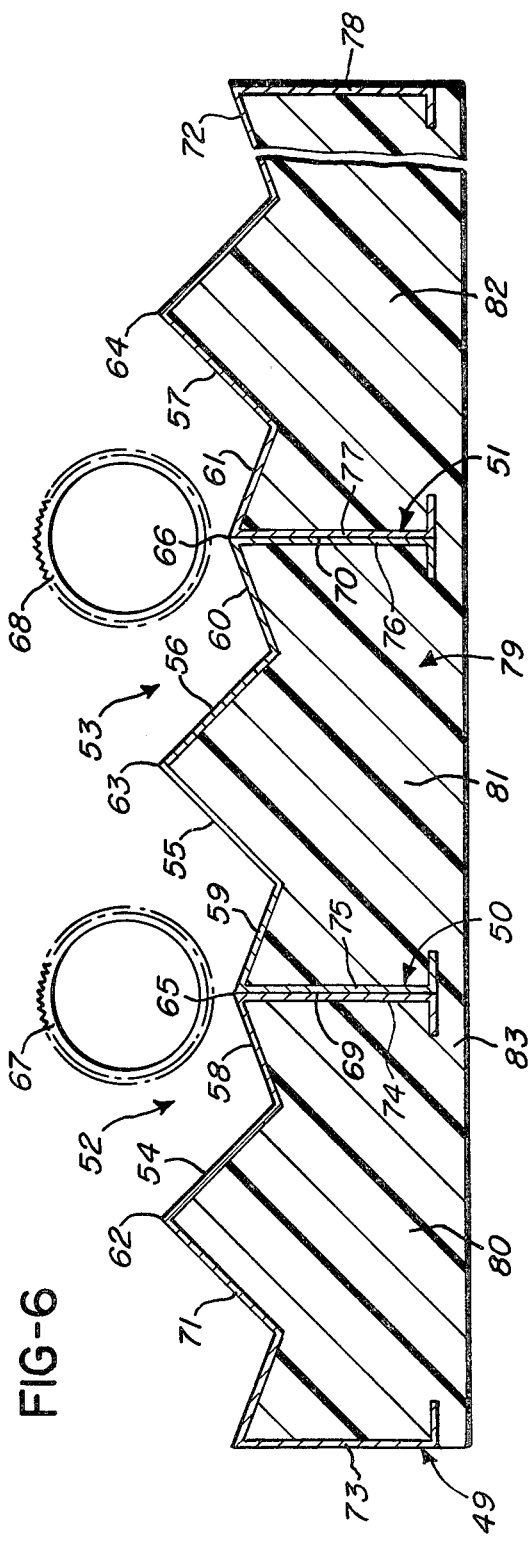
FIG. 6 is an elevational view in cross section of another tube and reflector assembly according to this invention.

In yet another preferred embodiment of the present invention as illustrated in FIG. 6, the reflector is formed by a series of juxtaposed channel members 49, 50 and 51, the upper, outer reflective surfaces of which present the compound angular reflective surface characterized by the troughs 52 and 53, corresponding to those referenced as 27 in FIG. 2, and defined respectively by the pairs of upwardly divergent sidewalls 54 and 55 and 56 and 57 and the pairs of tented bottom wall segments 58 and 59 and 60 and 61. In the case of these particular channels however, it will be observed that the sidewalls of the troughs culminating in the relatively high peaks 62, 63 and 64 are the interior longitudinal strips of the upper channel surface; while the tented bottom walls of the trough culminating in the relatively low peaks 65 and 66 are formed by the marginal longitudinal strips thereof. In this version, the fluid-carrying tubular members 67 and 68 are accordingly positioned in and to be bisected by the planes 69 and 70 of contact between the consecutive and laterally abutting channel members with the result that the final array of reflective troughs and tubes, including the relative angles, dimensions and positioning thereof, is the same as provided in the embodiment illustrated in FIGS. 1 and 2 and as shown in FIG. 3. Since two adjoining channel members of this variety are required to form one reflective trough, it follows that an "extra" one-half of a channel member will exist at each edge 71 and 72 of the overall reflective surface and that the number of whole channel members required to form a given number of reflective troughs will be one greater than such given number.

Another feature of the channel members in the FIG. 6 embodiment derives from their parallel legs or webs 73, 74, 75, 76, 77 and 78 depending from the outer edges of their upper surface (i.e., of the marginal strips forming a part of such surface) at right angles to the plane of the array so that they may be conveniently and accurately positioned and held together in side-by-side contacting position thereby to form the reflective surface characterized by the desired parallel troughs in which the tubes are to be positioned. While the channels may be conveniently held in this relationship by conventional fasteners such as rivets, metal screws or nuts and bolts (not shown) passing through the contiguous side webs, even greater manufacturing facility may be achieved in the use of these channels by simply arranging them in their desired association in inverted condition; i.e. with their side webs extending upwardly, and pouring a foamed plastic material 79 over and into them to fill the interiors 80, 81 and 82 of the channels and to overflow them to form a continuous sheet or layer 83 as an integrating component to hold all of the adjoining channels together. A particularly suitable material for this use is a foamed concrete such as that which is marketed under the brand name "Elastizell" which is not subject to variations in dimension or hardness upon repeated or prolonged exposure to changing and/or elevated temperatures. At the same time, the foamed material, where it is of low thermal conductivity, such as polystyrene, polyurethane, or the aforementioned concrete, will cause the entire reflector assembly consisting of the adjoining channel members and the foamed material to act as a thermally insulating sheet or barrier to preserve the elevated temperatures within enclosure (such as 18 in FIG. 2) of the tubular members resulting from the heat of the impinging solar rays, thereby further to enhance the efficiency of the apparatus.

Still further to improve the heat absorptive characteristics of of the copper or other thermally conductive metal of which the tubes are composed and thereby further to increase the heat or energy collecting capacity of the device, all outer surfaces of the tubes, including the grooved portions thereof, may be chemically tarnished by well known processes which result in a chemically induced change of color or dulling of luster but do not involve application of separate films or coatings, the less integrated aspects of which have been found to be less efficient in the promotion of heat transfer than the chemically effected coloration. In the case of copper tubing, the chemical tarnishing of the outer tube surfaces may be conveniently and economically achieved by immersing them with the grooves already inscribed thereon in an aqueous solution of a water soluble oxidizing agent such as potash sulfurated, sometimes known as "liver of sulfur."

While the present invention has been described in detail in connection with certain preferred embodiments thereof, it is to be understood that the foregoing particularization and detail have been for the purposes of illustration only and that various modifications and substitutions may be made by those familiar to the art without departing from the invention as it is defined in the subjoined claims.

What is claimed is:

1. A solar energy collector having a heat absorbing medium, a thermally conductive chamber for housing said medium and structure for exposing said chamber to solar rays, wherein the improvement comprises means for reflecting and re-reflecting solar rays not directly striking said chamber on to the surfaces thereof not directly struck by solar rays wherein said means are in the form of a reflective surface characterized by a compound angular cross section, said reflective surface comprises at least one trough defined by upwardly divergent sidewalls spanned at their base by tented bottom wall segments, said chamber is at least one hollow tube at least partially nested within said trough and said trough is formed by at least two channels each having a compound angular upper surface comprising a pair of interior strips converging at their upper edges in a high peak and a pair of exterior marginal strips from the outer edge of each of which depends a web, said channels being held together in side-by-side abutting relationship whereby their high peaks define the trough whereof the sidewalls are the opposing interior strips and the tented bottom wall segments are the adjacent marginal strips.

2. A solar energy collector according to claim 1 wherein the interior cavities of said channels underlying their upper surface between their depending webs are filled with a foamed plastic material which extends beyond the limits of said webs to form a continuous integrated and integrating layer for holding said channels in their desired side-by-side association.

* * * * *